United States Patent [19]

Lagow et al.

[11] 4,144,374
[45] Mar. 13, 1979

[54] PERFLUORINATED FUNCTIONALIZED MATERIALS

[75] Inventors: Richard J. Lagow, Austin, Tex.; James L. Adcock, Knoxville, Tenn.; Shoji Inoue, Kodaira, Japan

[73] Assignee: Massachusetts Institute of Technology, Cambridge, Mass.

[21] Appl. No.: 756,451

[22] Filed: Jan. 3, 1977

Related U.S. Application Data

[63] Continuation-in-part of Ser. No. 531,931, Dec. 12, 1974, abandoned.

[51] Int. Cl.² .............................................. B32B 27/06
[52] U.S. Cl. .................................... 428/334; 428/220;
 428/422; 428/523; 427/248 R; 427/302;
 526/13; 526/19; 252/426; 252/428; 260/544;
 526/26
[58] Field of Search ................. 428/98, 220, 334, 422,
 428/523; 427/248 R, 302

[56] References Cited

U.S. PATENT DOCUMENTS

| | | | |
|---|---|---|---|
| 3,770,567 | 11/1973 | Grot | 428/442 X |
| 3,849,243 | 11/1974 | Grot | 428/442 X |
| 3,865,615 | 2/1975 | Manly | 429/248 R |
| 4,020,223 | 4/1977 | Dixon et al. | 427/248 R |

*Primary Examiner*—P. C. Ives
*Attorney, Agent, or Firm*—Arthur A. Smith, Jr.; David E. Brook

[57] ABSTRACT

Perfluorinated functionalized materials are disclosed which are prepared by simultaneous perfluorination and functionalization. A wide variety of materials can be used including polymers and other branched or straight chain hydrocarbons. The material to be perfluorinated is placed in a direct fluorination apparatus and a mixture of fluorine and oxygen is passed over the material using La-Mar direct fluorination techniques. With materials such as polyethylene or polypropylene, pendant alkyl groups are converted to either acid fluoride groups or perfluoroalkyl groups, with the exact ratio of each being dependent upon the specific fluorine-to-oxygen ratio used.

7 Claims, 1 Drawing Figure

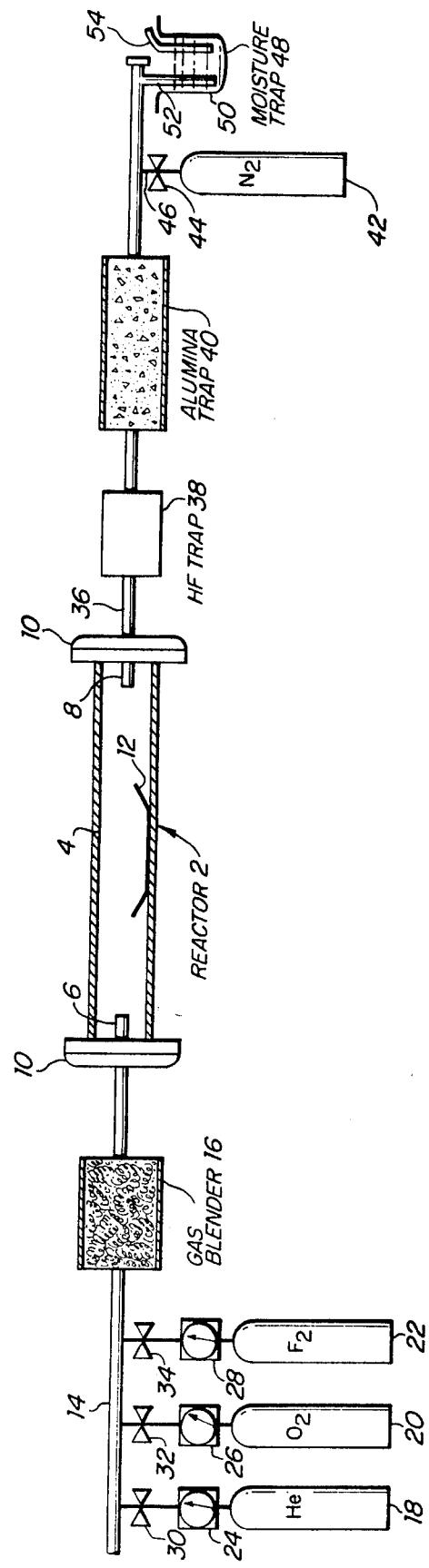

PERFLUORINATED FUNCTIONALIZED MATERIALS

RELATED APPLICATIONS

This is a continuation-in-part of U.S. Ser. No. 531,931, filed Dec. 12, 1974, now abandoned.

BACKGROUND OF THE INVENTION

1. Field of the Invention

This invention is in the field of fluorine chemistry and more particularly in the field of direct fluorination.

2. Description of the Prior Art

Although polymers have been known and manufactured for many years, it has only been recently that significant efforts have been initiated to provide functional groups on polymer surfaces. Such functional groups could provide new uses for the base polymers due to the nature of the functional group, or the functional group could provide a reactive site on the polymer surface so that a variety of chemical compounds could be reacted with the polymer.

One of the earlier applications for functionalized polymers involved the development of peptide syntheses based on chloromethylated polystyrene. See G. R. Stark, "Biochemical Aspects of Reactions on Solid Supports", Academic Press, New York (1971). These procedures avoided repetitious purifications in the syntheses of complicated peptides, and such techniques have become so successful that these "Merrifield resins" are now widely used and are commercially available. Chloromethylated polystyrene has also been used in more conventional organic synthesis work such as the promotion of intramolecular reactions without high dilution apparatus and the separation of polymer bound triphenylphosphine oxide after a Wittig reaction. See J. I. Crowley and H. Rapaport, *J. Amer. Chem. Soc.*, 92, 6363 (1970); M. A. Draus and A. Patchornik, *Israel J. Chem.*, 9, 269 (1971); S. V. McKinley and J. W. Rakshys, *Chem. Comm.*, 134 (1972); and F. Camps, J. Castells, J. Font and F. Vela, *Tetrahedron Lett.*, 1715 (1971).

Polystyrene has also been functionalized and subsequently used to form heterogeneous catalysts by reacting homogeneous catalysts with the functional groups. See R. H. Grubbs, C. Gibbons, L. C. Kroll, W. D. Bonds and C. H. Brubaker, *J. Amer. Chem. Soc.*, 95, 2373 (1973); and, R. H. Grubbs, L. C. Kroll and E. M. Sweet, *J. Macromol. Sci. Chem.*, A7, 1047 (1973). Heterogeneous catalysts have advantages over their homogeneous counterparts because they can be prepared in a more reactive form since dimerization reactions that occur in solution cannot occur with the bound species and because they are more easily recoverable.

In addition to the effort directed to the functionalization of polystyrene, some effort has been made to functionalize polyethylene. It has been recognized that polyethylene functionalized with carboxylic acid groups, for example, would be particularly useful because of the chemical and mechanical properties of polyethylene and because of the ease with which carboxylic acid units can be converted to esters, amides, ketones, etc. Several different oxidation procedures have been reported in the literature as successfully forming carboxylic acid groups on polyethylene surfaces. See B. G. Aristov, I. Yu. Babkin, F. K. Borisova, A. V. Kiselev and A. Ya. Korolev, *Izv. Acad, Nauk, SSSR, Otd. Khim.*, 6, 1017 (1963); *Akad, Nauk, SSSR, Bulletin*, 927 (1963); F. H. Ancker and F. L. Baier, U.S. Pat. No. 3,556,955 (1971); and, R. L. Augustine, Ed., "Oxidation, Vol. I", Marcel Dekker, New York, 1969, p6.

Although most of the effort to functionalize polymers to date has been directed towards polystyrene and polyethylene, it would be desirable to be able to produce functionalized fluoropolymers. Fluoropolymers are known to exhibit outstanding high temperature properties and are also unusually chemically inert. Because of these properties, they are used in applications where severe environmental factors are encountered.

Functionalization of fluoropolymers has not heretofore been achieved, however, probably due to a number of factors. Fluoropolymers are extremely inert so that functionalizing the fully fluorinated polymer is unlikely to succeed. Another problem has been the difficulty in carrying out the fluorinations themselves. Whereas many compositions can be directly chlorinated or brominated, it has been recognized that fluorine is dissimilar to these halogens in regard to direct halogenation. See McBee et al., U.S. Pat. No. 2,533,132 and U.S. Pat. No. 2,614,129. In fact, even though direct fluorination is a highly desirable process, prior attempts to use direct fluorination have often produced low to mediocre yields. Additionally, the yields are known to decrease as the molecular complexity of reactants becomes greater, thereby making direct fluorination of polymers an even more difficult matter. It is stated in one literature article, for example, that the yield of required fluorocarbon decreases as the molecular complexity of a hydrocarbon precurser increases, and it is difficult to fluorinate hydrocarbons above $C_{10}$ without extensive decomposition occuring. See R. E. Banks, "Fluorocarbons and Their Derivatives", Oldbourne Press, London, p. 7 (1964). It is even suggested in the patent literature that the treatment of polyfluoroalcohols with elementary fluorine results in destructive fragmentation of the carbon chain and loss of the functional group at the end of the chain. See Stallmann, U.S. Pat. No. 3,038,941.

Direct fluorination reactions involving elemental fluorine are characterized by quick evolution of large quantities of heat, ignition and flaming which promote product decomposition, often with explosive violence. The inablility to control direct fluorination reactions to produce high yields of the desired fluorinated reactant without concomitant fragmentation of the desired product has prevented direct fluorination from becoming a widely accepted method of fluorination. Because of these problems, a very diversified art has been developed to circumvent or obviate the use of fluorine gas by using inorganic, metallic fluorides, hydrogen fluoride, or electrolytic cells where no free fluorine is produced.

It has previously been believed to be extremely important to remove all sources of oxygen from direct fluorination systems. Free oxygen was thought, for example, to crosslink materials, presumably with epoxy bridges, which greatly decreased yield of the desired fluorinated product. It was also known to form carbonyl groups such as acyl fluorides and peroxides on contact with carbon radical sites.

Fluorine has been used to sensitize the oxidation of trichloro and tetrachloroethylene. See W. T. Miller, Jr. and A. L. Dittman, "The Mechanism of Fluorination. I. Fluorine Sensitized Oxidation of Trichloro and Tetrachloroethylene", *Mechanism of Fluorination*, vol. 78, p. 2793- (June 1956). In this work, elementary fluorine was added to excess oxygen and the mixture was passed into tetrachloroethylene and trichloroethylene to produce acid halides. This work was stated to provide convincing evidence that free radical initiation mechanisms controlled fluorine reactions and the authors concluded, based on this work, that the deleterious effect of oxygen upon the reactions of fluorine with organic compounds, even at low temperatures, was readily understandable.

More recently, work is described in the patent literature wherein certain polymers, such as polyethylene or polyesters, are treated to change their surface properties by subjecting them to fluorine gas of a mixture of fluorine and oxygen. See U.S. Pat. No 3,865,615 to Manly and Belgium patents 789,562 and 811,644. These processes are designed to modify only surface properties of the polymer to provide reactive sites where enzymes can attach, to increase the hydrophilicity, to increase the soil resistance, etc. Typically, very small percentages of fluorine are actually incorporated into the polymers in these reactions. Because of this, the bulk properties of the starting materials are not significantly altered.

SUMMARY OF THE INVENTION

The invention relates to a method for producing perfluorinated functionalized materials, including polymers. The material to be perfluorinated is placed in a fluorination apparatus and directly fluorinated using La-Mar techniques. In the La-Mar process, an inert atmosphere such as helium is introduced into the reactor. Fluorine gas is then introduced into the invert atmosphere in a very low initial concentration such as not to exceed about 6% at the end of 30 minutes. The fluorine concentration is then raised gradually and the temperature is maintained at a uniform low temperature so as to avoid uncontrolled fluorination. The La-Mar direct fluorination process is further disclosed in the following references: R. J. Lagow and L. L. Margrave, "Direct Fluorination of Organic and Inorganic Substances", *Proc. Natl. Acad. Sci.*, 67, 4, 8A (1970); R. J. Lagow and J. L. Margrave, *C & E News* 48, 40 (Jan. 12, 1970); R. J. Lagow and J. L. Margrave, "The controlled Reaction of Hydrocarbon Polymers with Elemental Fluorine", *Polymer Letters* 12, (April (Apr., 1974); A. J. Otsuka and R. J. Lagow, "The Direct Fluorination of Hydrocarbon Polymers", *J. Fluorine Chemistry* (May, 1974); and U.S. patent applications Ser. No. 718,128 (1968); Ser. No. 133,804 (1971); Ser. No. 133,803 (1971); and Ser. No. 133,865 (1971).

The simultaneous perfluorination and functionalization of polymers which can be achieved by such techniques is illustrated with polypropylene as follows:

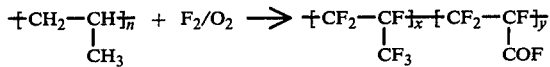

The ratio of acid fluoride groups

to perfluoromethyl groups

is dependant upon several factors including the particular fluorine-to-oxygen ratio used, the reaction time and the gas delivery techniques.

The presence of acid fluoride groups on the otherwise fully fluorinated polymer provides reactive sites which make the polymer useful for additional applications. For example, many compounds can be reacted directly with the acid fluoride group to tack species onto the polymer or the acid fluoride groups can be hydrolized to form carboxylic acid groups, which in turn can be reacted wth many other organic compounds. Thus, carboxylic acid groups on the polypropylene can be reacted with alcohols to form esters, amines to form amides, etc. Additionally, acid fluoride groups themselves can be reacted with certain homogeneous catalyst to convert them into heterogeneous catalysts.

Although the process is illustrated in terms of polypropylene, other polymers, as well as many monomers, could also be perfluorinated and functionalized using the techniques of this invention.

BRIEF DESCRIPTION OF THE DRAWINGS

The FIGURE illustrates schematically an apparatus suitable for practicing the invention described herein.

DESCRIPTION OF PREFERRED EMBODIMENTS

Referring now to the FIGURE in more detail, it can be seen that reactor 2 is formed from a horizontal cylindrical member. Preferably, wall members 4 are fabricated from prefluorinated nickel, but other materials which ae inert to fluoride can also be used. Reactor 2 has a gas inlet 6, where reactants are introduced, and an outlet 8, where excess reactants exit from reactor 2. Flange members 10 complete with appropriate seals, such as Teflon ® o-rings, to provide a tight seal between reactor 2, gas inlet 6 and product outlet 8, and these flanges are also removable to provide access to reactor 2.

Solid reactants to be fluorinated and functionalized are placed in reactant vessel 12 which can be placed into or taken from reactor 2 by removing either flange 10. Reactant gases as well as any inert carrier gases are fed to reactor 2 through inlet line 14 which can be fabricated from copper tubing. A gas blender 16 is provided prior to gas inlet 6 and serves to thoroughly mix each of the individual gases passing through inlet line 14 so that a homogeneous gas mixture enters reactor 2. A suitable gas blender can be formed from a brass cylinder containing fine copper turnings. Sources of inert and reactant gases are connected to inlet line 14; as illustrated, gas cylinders 18, 20 and 22 contain helium, oxygen and fluorine, respectively. Flowmeters 24, 26 and 28 and control valves 30, 32 and 34 are used to monitor and control the flow of each of these gases. Excess reactant, inert gases, and other products exit from reactor 2 by outlet 8 and pass through outlet line 36 through HF trap 38 and alumina trap 40, used to trap exiting hydrogen fluoride and fluorine, respectively. Nitrogen from cylinder 42 is bled into outlet line 36 by opening nitrogen valve 44; nitrogen gas passes through supply line 46 and into outlet line 36 wherein it passes to moisture trap 48, consisting of a beaker 50, partially filled with liquid, inlet line 52 and glass tube 54 which is open to the atmosphere.

The apparatus illustrated can be used to fluorinate and functionalize material as follows. Solid reactants to be fluorinated are placed in vessel 12 which in turn is placed in reactor 2. Flanges 10 are placed in position and tightened. Reactor 2 is flushed with a relatively high flow of helium by opening valve 30. The flow of helium is then reduced and valves 32 and 34 are opened to begin oxygen and fluorine flow. The initial flow of fluorine is kept low in relation to the helium flow so that it forms a low concentration of the total gas fed to the reactor; the concentration of fluorine is raised as fluorination proceeds by opening valve 34 and/or tightening valve 30. The desired fluorine-to-oxygen ratio can be achieved by adjusting valve 32 to the proper opening throughout the reaction. Typically, valves 30 and 32 are closed after some period and valve 34 is left open so that the solid reactant is fully fluorinated except where it has been functionalized.

The method described herein can be used to perfluorinate and functionalize a wide variety of starting materials. Either non-fluorinated or partially fluorinated materials are suitable. Of course, the starting material has to contain sites suitable for functionalization, such as alkyl end groups or alkyl branch chains. Some examples of suitable polymeric starting materials include: polyolefins such as polyethylene, polypropylene, copolymers of ethylene and propylene, etc.; and rubbers including natural or synthetic rubber. Examples of hydrocarbon monomer starting materials include straight or branched chain alkanes; olefins; cycloaliphatics or aromatic compounds with pendant alkyl groups such as methylcyclohexane, toluene and xylylene. Other starting materials will be known or ascertainable by no more than routine experimentation by those skilled in the art.

Further, materials to be perfluorinated and functionalized can have a wide variety of physical forms including powders, films, membranes, frits, pellets, rods, etc. When it is desired to completely fluorinate solid materials except for the functional sites, it is preferable to grind the material to a particle size of less than 100 mesh so that the fluorine is able to diffuse into the center of the particle to react. if larger particles are used, a non-fluorinated core of material may remain in the center of the particle. Perfluorination throughout the film can occur as long as the film is thin enough to allow fluorine penetration.

Shaped articles can be formed from hydrocarbon polymers and subsequently treated. Hydrocarbon polymers are easier to mold, extrude, etc. than their fluorinated counterparts, but the advantages of the fluorinated species can be obtained by the techniques described herein. Thus, bottles can be formed, for example, from polyethyene, and the bottle can subsequently be fluorinated and functionalized. Similarly, extruded tubes or rods, filaments, woven articles, etc., can be fluorinated.

Fluorine gas is the fluorinating agent used and is available commercially at high purity levels. The preferred source of oxygen is oxygen gas which is readily available commercially. Other oxygen containing gases can be used, however, such as air, carbon dioxide, carbon monoxide, nitrogen dioxide, nitrogen trioxide, sulfur trioxide, etc. Additionally, oxygen-containing groups on the starting materials such as sulfonic acid, nitrate or pendant ester groups can serve as a suitable source of oxygen as long as oxygen is released during fluorination.

Because of the tendency of fluorine to fragment materials, small concentrations of fluorine are introduced initially to the material in the reactor to be fluorinated. One method for delivering these low concentrations is to dilute the fluorine with a inert gas, such as helium or neon. Alternatively, the fluorine can be introduced at very low flow rates until partial fluorination has been achieved, after which the flow rate can be increased. Preferably, the flow of fluorine is mixed with an inert gas, such as helium, and the fluorine concentration is started at below 6% by volume of this mixture and it is maintained at this low concentration for at least 30 minutes. Thereafter, it is raised gradually until perfluorination has occurred. This is often done over a period of several days or more.

An important parameter of the process described herein is the fluorine-to-oxygen ratio. As used herein, this is a volume ratio, and it has been found that a wide variety of ratios are operable. For example, polyethylene has been fluorinated and functionalized using ratios of from 1/1 to 20/1 and polypropylene has been successfully fluorinated and functionalized using ratios from 2/1 to 20/1.

One factor which inlfuences the selection of the fluorine-to-oxygen ratio is the amount of functionalization desired. For example, when a polymer such as polypropylene is simultaneously fluorinated and functionalized, the amount of pendant methyl groups converted to acid fluoride groups will depend upon the specific fluorine-to-oxygen ratio used. As the fluorine-to-oxygen ratio decreases, the amount of acid fluoride groups formed increases. This provides a convenient method of controlling the amount of functional groups obtained in any specific reaction. It is believed that fluorine-to-oxygen ratios of below about 1/5 do not produce sufficient fluorination of available sites, whereas ratios of greater than about 50/1 do not produce significant functionalization.

Additionally, there can also be practical limitations on the fluorine-to-oxygen ratio. Since laboratory direct fluorinations generally begin with very low flow rates of fluorine, e.g., 4 cc/min., it is difficult to control flow rates of oxygen with any precision if the fluorine-to-oxygen flow rate is higher than about 20/1. This is not a limitation in larger scale fluorinations, however, nor in situations where preblended gases are employed.

It is particularly preferred to use fluorine-to-oxygen ratios of between about 1/1 and about 20/1 because these are achievable with commercially available equipment and because such ratios result in polymers having a sufficient range of functionalization for most practical applications and yet provide sufficiently fluorinated products.

Although the invention has heretofore been described in terms of the simultaneous flow of fluorine and oxygen, that is not believed to be necessary. But simply subjecting a hydrocarbon polymer to oxygen will not result in reaction of the oxygen with the polymer since the C-H bond is kinetically resistant to attack by molecular oxygen. Therefore, at least some fluorine is necessary to extract hydrogen atoms from the polymer. It is possible, however, to subject the starting reactant to a flow of fluorine initially, which is either pure or diluted with an inert gas, and after the polymer has been partially fluorinated to then subject it to a fluorine/oxygen mixture. It is also possible to initially subject the starting reactant to a fluorine/oxygen mixture and subsequently subject it to fluorine to complete fluorination. This technique might be used, for example, to decrease the amount of functionalization achieved.

The functionalization reactions described herein can be conveniently carried out at room temperature and atmospheric pressure. These conditions are clearly preferred with solid materials. The temperatures used should not exceed about 300° C. in any case since acid fluoride groups are not stable at such temperatures.

For reactions at room temperature and atmospheric pressure, the horizontal cylindrical reactor illustrated in the FIGURE can be used as well as vertical reactors which operate as fluidized beds. The process described herein is not limited by the starting material, however, and gases and liquids also can be treated. For compositions such as pentane and hexane, which can be vaporized, cryogenically controlled zone reactors, such as those described in U.S. patent application Ser. No. 379,876, filed Jul. 16, 1973, can be used. For liquids, appropriate mixtures of fluorine and oxygen can be bubbled through a typical liquid fluorination medium into which the reactant to be fluorinated and functionalized has been placed. The process can even be carried out in a static reactor, such as a bomb reactor, in which elevated temperatures and pressures are used, if desired.

Although not required, fluorination catalysts such as sodium fluoride, etc. can be added to the materials to be fluorinated.

The perfluorinated functionalized polymers or other materials produced by the process described herein have a wide variety of uses. One use is the formation of heterogeneous catalysts by tacking homogeneous catalysts, such as sodium manganese pentacarbonyl or sodium rhenium pentacarbonyl, onto functionalized, fluorinated polymer supports prepared as described herein. The conversion of sodium manganese pentacarbonyl to a heterogeneous catalyst can be illustrated with functionalized perfluorinated polypropylene as follows:

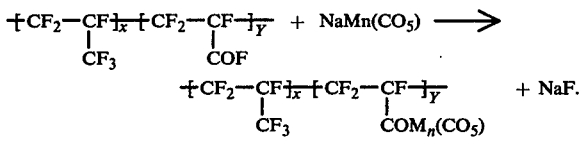

Acid fluoride groups can also be hydrolyzed to form carboxylic acid groups, which in turn can be reacted with a number or organic compounds. Thus, a hydrogenation catalyst for 1-olefins can be prepared by first hydrolyzing acid fluoride groups on a fluoropolymer, then converting the carboxylic acid groups to an ester, and subsequently reacting the product with a ruthenium complex such as ruthenium [dichlorotris (triphenylphosphine)] in the presence of sodium hypophosphite. The reactions can be illustrated starting with functionalized perfluorinated polypropylene as follows:

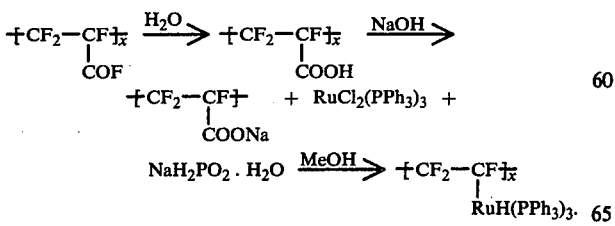

As another example, pendant carboxylic acid groups on polypropylene can be reacted with alcohols to form pendant esters. This can be illustrated using methyl alcohol as follows:

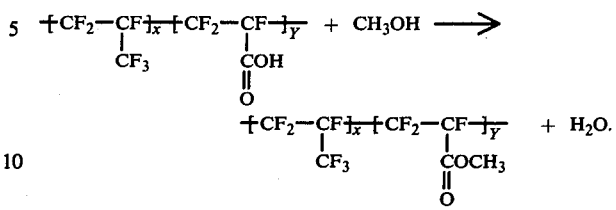

Alternatively, pendant carboxylic acid groups provide a convenient site for cross-linking fluoropolymers and one method of achieving such cross-linking is to react the carboxylated polymers with diamines which produces amide cross-linking bridges. Perfluorinated functionalized polymer films can be used to form membranes which are useful as solid electrolytes, ion exchange membranes, etc. After treatment as described herein, the resistivity of thin films is dramatically reduced. For example, thin films of polyethylene and polypropylene are known to have volume resistivities of about $10^{15} - 10^{16}$ ohm/cm$^3$. See *Modern Plastics Encyclopedia*, 1971–1972, pp. 624–5. Thin films of polyethylene or polypropylene functionalized and fluorinated herein have resistivities of about 5–6 ohm-cm or lower.

For use as conductive membranes, films should be at least about one mil thick so that they have sufficient structural integrity. On the other hand, such films should be less than about 25 mils thick so that the perfluorination and functionalization reactions can penetrate to a depth sufficient to achieve the dramatic lowering of the film resistivity, Preferably, the conductive membranes will be between about 5 and about 10 mils thick.

The resistivity of films should be below about 150 ohm-cm, and preferably below about 10 ohm-cm, for these conductive membranes.

Additionally, the fluorinated, functionalized polymers can serve as templates for binding proteins or other molecular species while certain chemical reactions are performed thereon.

The invention is further specifically illustrated by the following examples.

EXAMPLE 1

Simultaneous Functionalization and Fluorination of Polypropylene Powder ($F_2/O_2 = 5/1$)

An apparatus similar to the one illustrated in the FIGURE was used. The reactor consisted of a prefluorinated nickel tube 18 inches in length and having an inside diameter of one inch. It contained a prefluorinated nickel reactant vessel 7-½ inches long and ¼ inch wide. Fluorine gas flow was measured with a Hastings-Raydist model LF-50 mass flowmeter and model F-50M transducer; oxygen and helium flows were measured with simple gas flowmeters. Needle valves were used to control all gas flows, and ¼ inch O.D. copper tubing served as entrance and exit lines to the nickel reactor. An alumina-packed cylinder was used as an unreacted fluorine trap. To eliminate back diffusion of oxygen produced in the alumina trap as well as possible sources of air and moisture, a one inch O.D. by six inch tee point was placed between the reactor and strap. Gases from the reactor were exhausted into the side of the tee point and a flow of nitrogen (100cc/min), introduced into the top of the tee joint, was used to constantly flush the alumina trap. The bottom of the tee was connected with copper tubing to the alumina trap so that both nitrogen and the waste gases from the reactor were exhausted through the alumina trap. A standard gas bubbler was placed in the line after the alumina trap to prevent air and moisture from entering the alumina trap when the system was not in use. When the system was in use, the nitrogen also exhausted through the bubbler.

Approximately one gram of commercially available polypropylene powder having an average particle size under 150 mesh was placed in the nickel reactant vessel in the tubular reactor. The reactor was flushed with helium at 180cc/min. for one hour, after which oxyfluorination at room temperature and atmospheric pressure was initiated. The following conditions were used:

| He(cc/min) | F$_2$(cc/min) | O$_2$(cc/min) | Time (days) |
|---|---|---|---|
| 40 | 0.5 | 0.1 | 1 |
| 10 | 1 | 0.2 | 1 |
| 0 | 2 | 0.4 | 1 |
| 0 | 4 | 0.8 | 4 |
| 0 | 2 | 0 | 2. |

A white powder was obtained which exhibited an infrared absorption band at 1880 cm$^{-1}$ which is characteristic of acid fluoride (—COF) groups presumed to be present as side chains on the fluorinated polypropylene. Infrared spectra were run as KBr disks on a Beckman IR20A spectrometer. The acid fluoride groups were found to be present in an amount of $3.1 \times 10^{-3}$ mole/gram using the following assay procedure. About 50 mg. of precisely weighed oxyfluorinated polypropylene was poured into a 50 ml. beaker containing 10 ml. of 0.1 normal sodium hydroxide and heated for one hour. After cooling the solution, 10 ml. of 0.1 normal hydrochloric acid was added and the combined solution was heated for 30 minutes and cooled. This solution was titrated with 0.1 normal sodium hydroxide using a pH meter, and the acid fluoride content was calculated from the difference between the sodium hydroxide required to neutralize the solution and that required to neutralize a blank.

Differential scanning calorimetry (DSC) and thermogravimetric analysis can be carried out on a DuPont 990 Thermal Analyzer with appropriate attachments. DSC can be carried out on 10 to 20 mg. samples in air using crimped pans in argon using pans with perforated caps. The samples can be heated at 5° C./min, from 30° to 460° C. Specific heat calculations are made by the method described in: P. E. Slade, Jr. and L. T. Jenkins, *Techniques and Methods of Polymer Evaluation*, Marcel Dekker Inc., vol. 2, (1970). TGA can be performed in a nitrogen atmosphere and in air with a heating rate of 20° C./min. from 25° to 700° C.

It was determined that the fluorinated and functionalized polypropylene produced had a melting point of 82°–83° C. and a decomposition point of 168° C. An elemental analysis on the product yielded:

|  | C% | F% |
|---|---|---|
| calcd. | 25.67 | 69.31 |
| found | 25.79 | 69.23 |

EXAMPLE 2

Simultaneous Functionalization and Fluorination of Polypropylene (F$_2$/O$_2$ = 2/1)

The procedure, reactants and apparatus of Example 1 were used except that the ratio of fluorine-to-oxygen was maintained at 2/1 by raising the oxygen flow. The acid fluoride content of the fluorinated polypropylene was $4.7 \times 10^{-3}$ mole/gram.

EXAMPLE 3

Simultaneous Functionalization and Fluorination of Polypropylene Powder (F$_2$/O$_2$ = 10/1)

The procedure, reactants and apparatus of Example 1 were used except that the ratio of fluorine-to-oxygen was maintained at 10/1 by lowering the oxygen flow. The acid fluoride of the fluorinated polypropylene was $1.5 \times 10^{-3}$ mole/gram and the product polymer had a decomposition point of 315° C. Its elemental analysis was:

|  | C% | F% |
|---|---|---|
| calcd. | 24.82 | 72.76 |
| found | 26.83 | 68.25 |

EXAMPLE 4

Simultaneous Functionalization and Fluorination of Polyethylene Powder (F$_2$/O$_2$ = 5/1)

The procedure, reactants and apparatus of Example 1 were used except that low density polyethylene powder was substituted for polypropylene powder and the fluorine-to-oxygen ratio was maintained at 5/1 by lowering the oxygen flow rate. The fluorinated polyethylene had an acid fluoride content of $1.8 \times 10^{-3}$ mole/gram.

EXAMPLE 5

Simultaneous Functionalization and Fluorination of Polyethylene Powder (F$_2$/O$_2$ = 1/1)

The procedure, reactants and apparatus of Example 4 were used except that the fluorine-to-oxygen ratio was maintained at 1/1 by increasing the oxygen flow rate. The fluorinated polyethylene contained $4.9 \times 10^{-3}$ mole/gram of acid fluoride groups.

EXAMPLE 6

Simultaneous Functionalization of Ethylene-Propylene Copolymer (F$_2$/O$_2$ = 5/1)

Finely powdered ethylene-propylene copolymer could be functionalized and fluorinated using the procedure and apparatus of Example 4.

EXAMPLE 7

Simultaneous Functionalization and Fluorination of Natural Rubber (F$_2$/O$_2$ = 5/1)

Natural rubber could be functionalized and fluorinated by dissolving the rubber in carbon tetrachloride and bubbling a mixture of elemental fluorine and oxygen gases in a ratio of 5/1 through the resulting solution.

EXAMPLE 8

Simultaneous Functionalization and Fluorination of Pentane ($F_2/O_2 = 5/1$)

Pentane has been simultaneously functionalized and fluorinated using the following procedure.

A cryogenic zone reactor having four separated and insulated reaction zones is used. The reactor is a cylindrical nickel tube 24 inches in length and having an inside diameter of one inch, and it is tightly packed with fluorinated copper turnings. A reactant chamber also formed from nickel and 18 inches in length and 1.5 inches wide is connected at one end to the entrance of the reactor and at its opposite end to sources of helium, oxygen and fluorine gases 0.25 inch copper tubing. A cold box made from stainless steel and 9 inches deep and 6 inches wide is placed around the reactor, and four individual temperature zones maasuring 4 × 4 × 8 inches are formed with polyurethane foam for the reactor. Suitable product, by-product and excess reactant traps, such as −78° C. traps, are attached to the exit line from the reactor. This reactor is described in detail in copending U.S. patent application Ser. No. 379,876, filed July 16, 1973.

Pentane is placed in a nickel boat in the reactant chamber and evaporated using a flow of 50 to 100 cc. helium. All zones are cooled to −135° C., a temperature below the freezing point of pentane with a dry ice and alcohol mixture introduced into the four temperature zones. An initial flow of 0.5 cc/min. fluorine, 0.1 cc/min. oxygen, and 20 cc/min. helium is started. After 12 hours, the fluorine flow is increased to 1.0 cc/min. and the oxygen flow is increased to 0.2 cc/min. After an additional 12 hours, zone one is allowed to run out of dry ice. Twelve hours after zone one is clear of dry ice, the fluorine and oxygen flow rates are increased to 1.5 cc/min. and 0.3 cc/min., respectively, while still maintaining the helium flow rate at 20 cc/min. The fluorine and oxygen flow rates are maintained at 1.5 cc/min. and 0.3 cc/min., but on alternate days, th helium flow rate is reduced to 10 cc/min. followed by allowing one additional zone to clear of dry ice. Subsequent reducing of helium flow rates to five, then to zero cc/min., followed each time by warming of one additional zone, allows renewal of the reactant surface inside the reactor. Finally, as the reactor warms under the flow of fluorine and oxygen, perfluoropentanoic acid fluoride passes to a product trap (−120° C.) where it is collected.

n-Heptane and n-Octane have also been simultaneously functionalized and fluorinated by this procedure to produce their perfluorinated acid analogues.

EXAMPLE 9

Functionalization, Fluorination and Cross-Linking of Isooctane ($F_2/O_2 = 5/1$)

Isooctane could be functionalized and fluorinated by placing it in a glass reaction vessel and bubbling a mixture of fluorine and oxygen through it in a ratio of 5/1 using a series of glass capillaries to bubble the gases into the liquid. The fluorine and oxygen could be diluted with an inert gas such as helium. It is believed than the functionalized, fluorinated isooctane would also become highly cross-linked.

EXAMPLE 10

Formation of Carboxylated Fluoropolymers

Fluoropolymers containing pendant acid fluoride groups, such as the products of Examples 1–5, can be mixed with water to produce carboxylated fluorocarbon polymers. The reaction proceeds stoichiometrically and can be carried out at room temperature and atmospheric pressure.

EXAMPLE 11

Reaction of a Functionalized, Fluorinated Polymer with Butyl Alcohol

A functionalized, fluorinated polypropylene product of Example 3 could be mixed with normal butyl alcohol at room temperature. The alcohol is added until the pH of the solution becomes about 6–7 after which the product is filtered and dried. The product is polypropylene fully fluorinated at its backbone and having pendant butoxy groups.

EXAMPLE 12

Reaction of a Functionalized, Fluorinated Polymer with Aniline

A functionalized, fluorinated polyethylene product of Example 4 could be mixed with aniline at room temperature. The resulting product is washed and dried and is polyethylene fully fluorinated at its backbone and having pendant anilide groups.

EXAMPLE 13

Initial Partial Fluorination and Subsequent Simultaneous Fluorination and Functionalization of Polypropylene About 2.3 grams of finely divided polypropylene powder as partially fluorinated and subsequently functionalized and fluorinated using the procedure, reactants and apparatus of Example 1 except that the flow rates were:

| He(cc/min) | $F_2$(cc/min) | $O_2$(cc/min) | Time (days) |
|---|---|---|---|
| 40 | 1 | 0 | 2 |
| 20 | 1 | 0 | 2 |
| 10 | 1 | 0 | 2 |
| 0 | 2 | 0.5 | 2 |
| 0 | 4 | 2.0 | 5. |

EXAMPLE 14

Simultaneous Fluorination and Functionalization of Polymer Films to Produce Fluorinated Conductive Films The procedures of Example 1 were used to treat a series of thin films. In each case, the oxygen flow rate was adjusted to give the specified fluorine-to-oxygen ratio. After treatment, the film resistivity was measured in a 1N KCl solution as follows. The results were:

| Film | $F_2/O_2$ | (ohm/cm) Fluorinated |
|---|---|---|
| 8 mil polypropylene | 5/1 | 4.5 |
| 8 mil polypropylene | 2/1 | 5.1 |
| 8 mil polypropylene | 10/1 | 6.1 |
| 8 mil polypropylene | 5/1 | 5.1 |
| 8 mil polypropylene | 1/1 | 4.8 |
| 8 mil ethylene-propylene copolymer | 5/1 | 5.3 |

-continued

| Film | $F_2/O_2$ | (ohm/cm) Fluorinated |
|---|---|---|
| 2 mil isooctane | 5/1 | 3.8 |

It will be recognized by those skilled in the art that there are many modifications or equivalents to the reactants, equipment and techniques specifically described herein. Such modifications and equivalents are intended to be included in the claims presented hereafter.

What is claimed is:

1. A conductive membrane comprising a perfluorinated polymer having pendant functional groups thereon, said pendant functional groups being selected from acid fluoride, carboxylic acid, or a mixture of both.

2. A conductive membrane of claim 1 having a resistivity of below about 150 ohm-cm.

3. A conductive membrane of claim 2 wherein said perfluorinated polymer comprises a polyolefin.

4. A conductive membrane of claim 3 wherein said polyolefin is polyethylene.

5. A conductive membrane of claim 3 wherein said polyolefin is polypropylene.

6. A conductive membrane of claim 3 wherein said polyolefin is a copolymer of ethylene and propylene.

7. A conductive membrane of claim 3 having a thickness of from about one mil to about 25 mils.

* * * * *